(12) United States Patent
Kim et al.

(10) Patent No.: US 11,681,154 B2
(45) Date of Patent: Jun. 20, 2023

(54) WEARABLE DEVICE INCLUDING A PLASTIC LENS SUBSTRATE

(71) Applicant: LG CHEM, LTD., Seoul (KR)

(72) Inventors: Hye Min Kim, Daejeon (KR); Yong Suk Kim, Daejeon (KR); Boo Kyung Kim, Daejeon (KR); Yeong Rae Chang, Daejeon (KR); Bu Gon Shin, Daejeon (KR); So Young Choo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 274 days.

(21) Appl. No.: 16/765,888

(22) PCT Filed: Dec. 11, 2018

(86) PCT No.: PCT/KR2018/015680
§ 371 (c)(1),
(2) Date: May 21, 2020

(87) PCT Pub. No.: WO2019/117588
PCT Pub. Date: Jun. 20, 2019

(65) Prior Publication Data
US 2020/0355932 A1    Nov. 12, 2020

(30) Foreign Application Priority Data
Dec. 15, 2017 (KR) .......................... 10-2017-0173187

(51) Int. Cl.
*G02B 27/42* (2006.01)
*G02B 1/04* (2006.01)
*G02B 27/01* (2006.01)
*G06T 19/00* (2011.01)

(52) U.S. Cl.
CPC ......... *G02B 27/4205* (2013.01); *G02B 1/041* (2013.01); *G02B 27/0172* (2013.01); *G06T 19/006* (2013.01)

(58) Field of Classification Search
CPC .................... G02B 1/041; G02B 1/045; G02B 2027/0123; G02B 27/0172; G02B 27/4205; G02B 5/1852; G02B 27/42; G06T 19/006
See application file for complete search history.

(56) References Cited

U.S. PATENT DOCUMENTS

| | | | |
|---|---|---|---|
| 8,848,289 B2 | 9/2014 | Amirparviz et al. | |
| 9,423,552 B2 | 8/2016 | Richards et al. | |
| 9,658,456 B2 | 5/2017 | Mukawa | |
| 2003/0202247 A1 | 10/2003 | Niv et al. | |
| 2009/0035548 A1 | 2/2009 | Aiki et al. | |
| 2010/0296181 A1* | 11/2010 | Nomura ............. | G02B 13/0015 359/811 |
| 2011/0310491 A1* | 12/2011 | Takagi ............... | G02B 27/0172 385/38 |

(Continued)

FOREIGN PATENT DOCUMENTS

| | | |
|---|---|---|
| CN | 1105927 C | 4/2003 |
| JP | 11072637 A | 3/1999 |

(Continued)

*Primary Examiner* — Kenneth Bukowski
(74) *Attorney, Agent, or Firm* — Dentons US LLP (57) ABSTRACT

A wearable device which is lighter, relatively safer at the time of breakage, and smaller than a wearable device having a lens substrate that is a glass substrate.

9 Claims, 3 Drawing Sheets

(56) References Cited

U.S. PATENT DOCUMENTS

| | | |
|---|---|---|
| 2014/0299793 A1 | 10/2014 | Deng |
| 2017/0003505 A1 | 1/2017 | Vallius et al. |
| 2017/0010465 A1 | 1/2017 | Martinez et al. |
| 2017/0031171 A1 | 2/2017 | Vallius et al. |
| 2017/0336552 A1 | 11/2017 | Masuda et al. |

FOREIGN PATENT DOCUMENTS

| | | | |
|---|---|---|---|
| JP | 2001042131 A | | 2/2001 |
| JP | 2008535032 A | | 8/2008 |
| JP | 2010033029 A | | 2/2010 |
| JP | 2012-003040 A | | 1/2012 |
| JP | 2014029432 A | | 2/2014 |
| JP | 2015049376 A | | 3/2015 |
| JP | 2015-105990 A | | 6/2015 |
| JP | 2015194549 A | | 11/2015 |
| JP | 2016-85426 A | | 5/2016 |
| JP | 2017207686 A | | 11/2017 |
| KR | 20050010848 | * | 1/2005 |
| KR | 10-1128635 B1 | | 12/2006 |
| KR | 20120054481 | * | 5/2012 |
| KR | 10-20150105941 A | | 9/2015 |
| KR | 10-2017-0104370 A | | 9/2017 |
| WO | 2013/050853 A2 | | 4/2013 |

\* cited by examiner

WEARABLE DEVICE INCLUDING A PLASTIC LENS SUBSTRATE

CROSS-REFERENCE TO RELATED APPLICATIONS

This application is a U.S. national stage of international Application No. PCT/KR2018/015680 filed Dec. 11, 2018, and claims priority to and the benefit of Korean Patent Application No. 10-2017-0173187 filed in the Korean Intellectual Property Office on Dec. 15, 2017, the entire contents of which are incorporated herein by reference.

TECHNICAL FIELD

The present invention relates to a wearable device, and in particular, a wearable device including a plastic lens substrate.

BACKGROUND

A wearable device such as a virtual reality device or an augmented reality device that forms a diffraction light guide pattern in a lens such as general eyeglasses to display a desired image to a user. In general, glass substrates having a high refractive index are used as the lens substrate for traditional wearable devices. The glass substrate has an advantage of having the high refractive index and high light transmittance, but when the glass substrate is broken, the glass substrate may seriously damage an eye of the user and because the glass substrate is heavy, the glass substrate is inconvenient to wear for a long time.

Accordingly, there is a need for research on a wearable device to replace the glass substrate used in traditional wearable devices.
[Related Patent Document]
Korean Patent Unexamined Publication No. KR 10-2015-0060562 A

SUMMARY

The present invention provides a wearable device. Specifically, the present invention provides a wearable device including a plastic lens substrate.

However, the object to be solved by the present invention is not limited to the aforementioned object and other objects, which are not mentioned above, will be apparent to a person having ordinary skill in the art from the following description.

An embodiment of the present invention provides a wearable device including: a plastic lens substrate; and a diffraction light guide unit with a diffraction light guide pattern provided on the plastic lens substrate, wherein a thickness of the plastic lens substrate is 0.4 mm or more and 1.5 mm or less, a thickness deviation for an average thickness of the plastic lens substrate is within 1%, and the number of total reflections of the diffraction light per 30 mm length on the plastic lens substrate is 40 or more and 100 or less.

According to an embodiment of the present invention, a wearable device is lighter and relatively safer in the event of breakage or damage compared to a traditional wearable device which uses a glass substrate as the lens substrate.

According to an embodiment of the present invention, a wearable device can prevent an extracted light amount from being decreased by adjusting the number of total reflections of diffraction light not to be excessively high.

According to an embodiment of the present invention, a wearable device applies a plastic lens substrate having a small thickness deviation to implement an excellent resolution.

According to an embodiment of the present invention, a wearable device applies a plastic lens substrate having a small thickness to reduce a volume of a product.

DETAILED DESCRIPTION

In this specification, it will be understood that when a member is referred to as being "on" the other member, it may be directly on the other member or another member may also be present between both members.

Throughout the specification, unless explicitly described to the contrary, the word "comprise" and variations such as "comprises" or "comprising" will be understood to imply the inclusion of stated elements but not the exclusion of any other elements.

In this specification, the term "length of substrate" as a direction parallel to a substrate surface means a direction from the center of a first region to the center of a second region in a diffraction light guide unit on a plastic lens substrate.

In this specification, a particle diameter of a particle may be measured by a scanning electron microscope (SEM) image, a transmission electron microscope (TEM) image, or a particle size analyzer (Malvern, Japan). Specifically, the particle diameter of the particle may be a secondary particle size measured by dynamic light scattering on a colloidal nano solution using the particle size analyzer.

In this specification, in respect to an average particle diameter of the particle, maximum diameters of 50 to 100 particles may be measured at a magnification in which a size of one smallest particle becomes 2 mm to 5 mm by photographing the particle by a transmission electron microscope (TEM) and an average value thereof may be obtained as the average particle diameter.

In this specification, a glass transition temperature ($T_g$) may be a value that is measured by raising a temperature at a heating rate of 10° C./min within a temperature range of −15° C. to 200° C. by using a differential scanning calorimeter (DSC) (DSC 823e; Mettler Toledo) and determined as a midpoint of a DSC curve.

In the present specification, an optical refractive index may be a value measured based on a wavelength of 532 nm using Spectroscopy Ellipsometry (Ellipsometer M-2000, J. A. Woollam) at 25° C. and 50 RH % and using a Cauchy Film Model.

In this specification, a field of view (FOV) may mean a range of the incident angle at which a traveling angle of the diffraction light becomes larger than a minimum traveling angle at which total reflection may be made the plastic lens substrate.

In this specification, light transmittance may be a value measured in a transmittance mode using a Solidspec 3700 which is a UV-Vis-NIR Spectrophotometer equipment of SHIMADZU.

In this specification, haze may be a value measured by COH-400 made by Nippon Denshoku.

In this specification, surface flatness may be an Ra value measured by NX10 which is an AFM machine of Park Systems for an area of 4 μm×4 μm using AFM Probe of NCHR-50 of Nanoworld.

In this specification, a duty may mean a "width of pattern structure/pitch of pattern structure".

In this specification, luminance and resolution may be measured from an image that is incident using a specific light source and is emitted through total reflection in the plastic lens substrate.

Specifically, a surface light source is formed by closely attaching a diffuser in front of an LED light source (SML-LX1610RGBW, A, 525 nm) and then, a UASF 1951 resolution chart is attached and an incident portion of a specimen and the light source are disposed so that a distance between the incident portion and the light source becomes 1 mm. The incident light is made to be incident in a direction vertical to the specimen. Further, a CCD monitor (CA 2000) and an output portion of the specimen are disposed so that a distance between the CCD monitor (CA 2000) and the output portion of the specimen becomes 17 mm. An image of a photo output from a diffraction light guide sample is analyzed using an Image-J program to take a maximum value of measured luminance as a luminance value.

Figure 6:
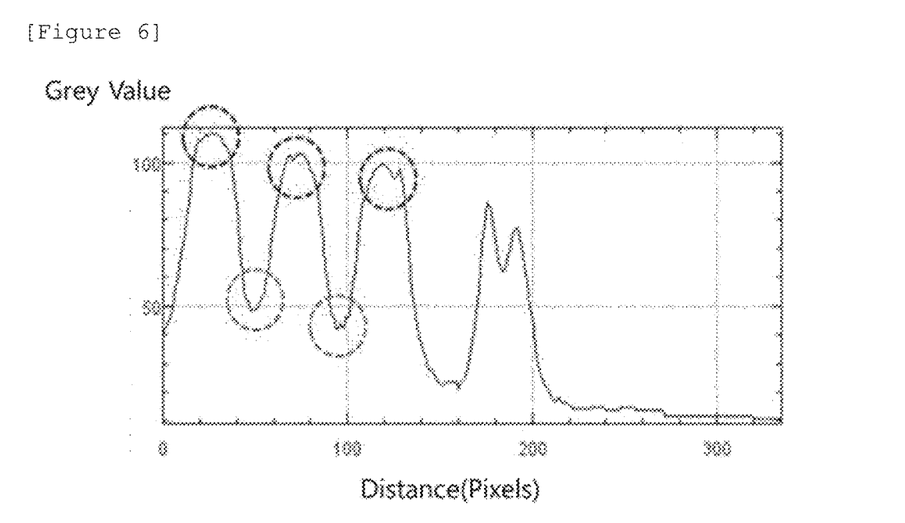
FIG. 6 is a graph of the results of an Image-J analysis of an image emitted by a wearable device according to an exemplary embodiment.

In addition, the resolution may be measured by a modulation transfer function (MTF) measurement method. Specifically, in a photo output by a method such as luminance measurement, for Element 1 (4 cycles/degree) of Group 2, MTF of each of horizontal and vertical stripes is calculated and an arithmetic mean of the MTF is taken and used as an MTF value of the diffraction light guide sample. The MTF is obtained using Equation 1 below after analyzing the image of the photo output from the diffraction light guide sample by the Image-J program. An average value of each of $I_{max}$ and $I_{min}$ is used by taking values of tree points like a region ($I_{max}$: red circle and $I_{min}$: blue circle) displayed in FIG. 6.

$$\text{MTF} = (I_{max} - I_{min})/(I_{max} + I_{min}) \quad \text{[Equation 1]}$$

As a result of continuing research to replace a lens base of a glass material applied to the existing wearable device with a lens base of a plastic material, the present inventors have found that characteristics including a refractive index, a diffraction light guide pattern pitch, a height, and the like, of the diffraction light guide unit and physical properties including a thickness of the plastic lens substrate, a thickness deviation, the number of total reflections of incident light, and the like, have a significant effect on performance of the wearable device. Furthermore, the refractive index of the diffraction light guide unit and the pitch of the diffraction light guide pattern applied to the wearable device is adjusted to control the diffraction angle of the diffraction light traveling in the plastic lens substrate and the optical refractive index, the thickness, the thickness deviation, and the like of the plastic lens substrate are adjusted to control a total reflection characteristic of diffracted light, and as a result, a plastic lens substrate optimized for the wearable device is invented.

Hereinafter, the present invention will be described in more detail.

An embodiment of the present invention provides a wearable device including a plastic lens substrate; and a diffraction light guide unit with a diffraction light guide pattern provided on the plastic lens substrate.

Figure 1:
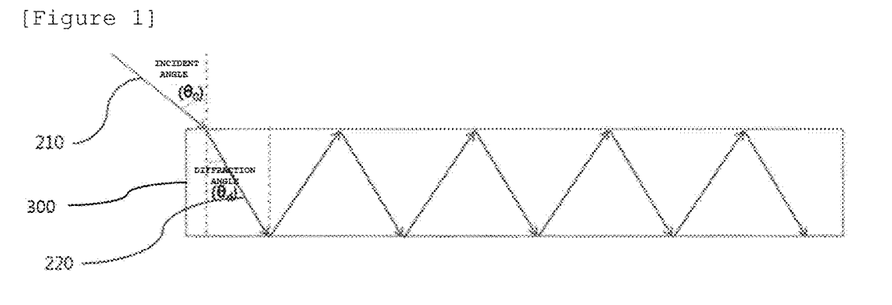
FIG. 1 is a schematic illustration of the path along which light incident on a plastic lens substrate of a wearable device travels on the inside of the plastic lens substrate according to an exemplary embodiment.
Figure 2:
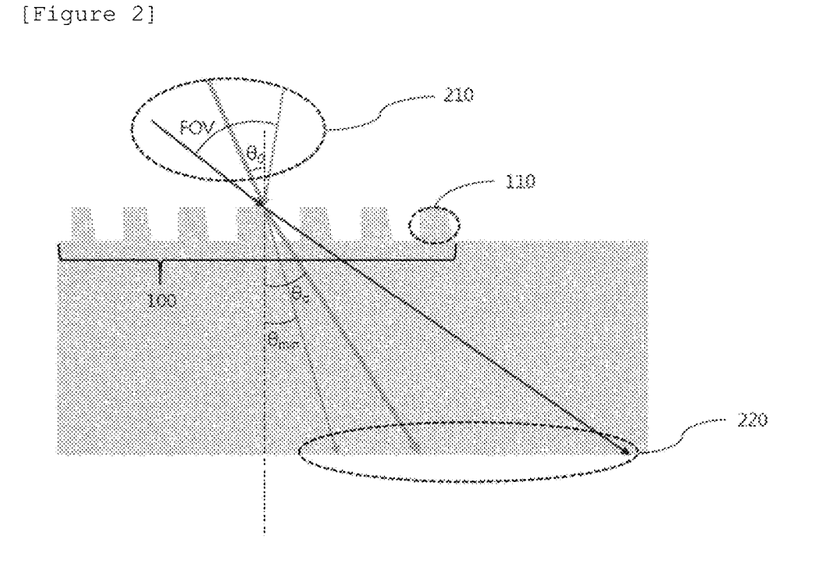
FIG. 2 is a schematic illustration of the diffraction pattern of incident light obtained by extending a diffraction light guide pattern of a diffraction light guide unit provided by a plastic lens substrate of a wearable device according to an exemplary embodiment.

FIG. 1 is a diagram schematically illustrating that light incident on a plastic lens substrate applied to a wearable device is diffracted and totally reflected and travels on the inside of the plastic lens substrate according to an embodiment of the present invention and FIG. 2 is a diagram schematically illustrating that the diffraction light guide pattern diffracts incident light by extending a diffraction light guide pattern of a diffraction light guide unit provided a plastic lens substrate. As illustrated in FIGS. 1 and 2, incident light 210 incident on a diffraction light guide unit 100 is incident at an incident angle of $\theta_0$ and diffracted by a diffraction light guide pattern 110 of the diffraction light guide unit 100 and diffracted diffraction light 220 travels inside the plastic lens substrate 300 at a diffraction angle of $\theta_d$.

The diffraction angle of the light incident on the diffraction light guide unit with the diffraction light guide pattern may be obtained by Equation 2 below:

$$n \sin \theta_d - n_0 \sin \theta_0 = \lambda/a. \quad \text{[Equation 2]}$$

Throughout this specification, n denotes the refractive index of the diffraction light guide unit, $n_0$ denotes the refractive index of air, $\lambda$ denotes a wavelength, and a denotes the pitch of the diffraction light guide pattern.

According to an embodiment of the present invention, the thickness of the plastic lens substrate is 0.4 mm or more and 1.5 mm or less. Specifically, the thickness of the plastic lens substrate may be 0.4 mm or more and 1.3 mm or less, 0.5 mm or more and 1.1 mm or less, or 0.6 mm or more and 1 mm or less.

Figure 3:
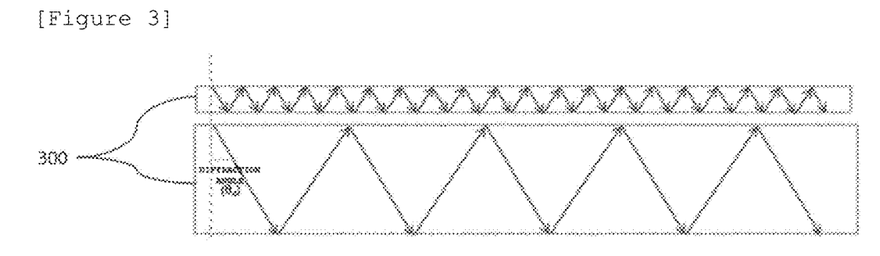
FIG. 3 is a schematic illustration of the variation in the number of total reflections of diffraction light in a plastic substrate depending on a thickness of a plastic lens substrate of a wearable device according to an exemplary embodiment.

FIG. 3 is a diagram schematically illustrating that the number of total reflections of diffraction light varies in a plastic substrate depending on a thickness of a plastic lens substrate. As illustrated in FIG. 3, as the thickness of the plastic lens substrate 300 is smaller, the number of total reflections increases in spite of the diffraction light 220 having the same diffraction angle. Therefore, there is an advantage that when the thickness of the plastic lens substrate 300 is within the above range, it is possible to minimize loss of a light amount by preventing an excessive amount of total reflection of the diffraction light 220 and furthermore it is possible to minimize a volume and/or size of the wearable device.

According to an exemplary embodiment of the present invention, the thickness deviation for an average thickness of the plastic lens substrate is 1% or less. Specifically, the thickness deviation for the average thickness of the plastic lens substrate may be 0.5% or less. The thickness deviation for the average thickness of the plastic lens substrate may be derived by Equation 3 below:

Thickness deviation (%)={(maximum thickness−minimum thickness)/average thickness}×100.   [Equation 3]

In the present specification, the maximum thickness, the minimum thickness and the average thickness of a member may be obtained by a noncontact measurement method using Optical Wafer Thickness Measurement system (OWTM) equipment of FiberPro at 25° C. and 50 RH %. Specifically, a sample having a size of 50 mm×50 mm may be prepared, and the thickness may be measured at an interval of 1 mm for each of length and width with respect to an area of 40 mm×40 mm excluding 5 mm from an end of each corner to obtain thickness values for a total of 1681 points and then, a largest value may be set as the maximum thickness and a smallest value may be set as the minimum thickness, and the average thickness may be obtained through an arithmetic average value for a total of 1681 points measured.

In this specification, "thickness deviation for the average thickness" may have the same meaning as "thickness deviation".

According to an exemplary embodiment of the present invention, since the thickness deviation of the plastic lens substrate is much smaller than the thickness deviation (2% to 5%) of a general plastic lens substrate, the wearable device may output optical information having excellent resolution.

According to an embodiment of the present invention, the number of total reflections of the diffraction light is 40 or more and 100 or less per 30 mm which is a length on the plastic lens substrate. Specifically, the total number of times of total reflection of diffracted light per 30 mm of the length on the plastic lens substrate may be 40 or more and 80 or less, 40 or more or 50 or less, or 40 or more and 45 or less.

The extracted light amount is increased by controlling the number of total reflections which occur in the plastic lens substrate to the above range to increase the luminance of an output image.

According to an exemplary embodiment of the present invention, number of total reflections may be based on light having a wavelength of 532 nm.

According to an exemplary embodiment of the present invention, optical refractive indexes of the diffraction light guide unit and the plastic lens substrate in the wavelength of 532 nm may be 1.65 or more. Since the optical refractive index of a general high refractive index glass substrate may be 1.65 or more in the wavelength of 532 nm and the plastic lens substrate according to an embodiment of the present invention has an optical refractive index equal to or higher than the glass substrate, the plastic lens substrate substitutes for the lens substrate of the glass material to be applied to the wearable device.

According to an exemplary embodiment of the present invention, a difference in refractive index between the diffraction light guide unit and the plastic lens substrate may be 0.05 nm or less. When the diffraction light guide unit and the plastic lens substrate have the refractive index difference of the above range, loss of light between the diffraction light guide unit and the plastic lens substrate may be minimized.

According to an exemplary embodiment of the present invention, a viewing angle of the wearable device may be 30° or more. More specifically, the viewing angle may be 40° or more. A wider image may be viewed by providing the viewing angle of the aforementioned range to provide an image having an excellent quality to a user.

Figure 5:
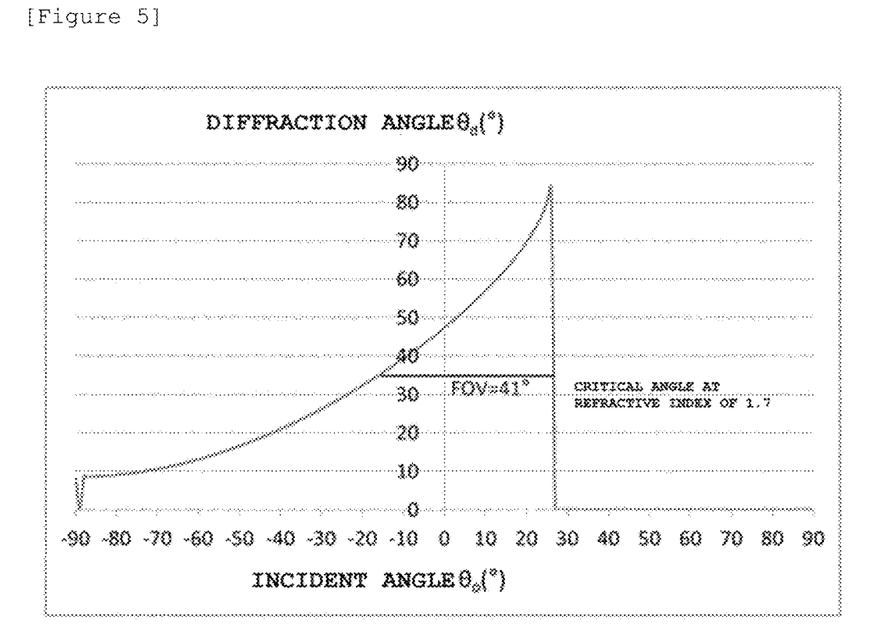
FIG. 5 is a graph of a relationship between an incident angle ($\theta_o$) and a diffraction angle ($\theta_d$) when a refractive index of a diffracting light guide unit on a plastic lens substrate of a wearable device is 1.7, a pitch is 425 nm, and a wavelength of incident light is 532 nm, according to an exemplary embodiment.

FIG. 5 illustrates a diffraction angle ($\theta_d$) depending on an incident angle ($\theta_o$) when a refractive index of a diffracting light guide unit on a plastic lens substrate applied to a wearable device is 1.7, a wavelength of incident light is 532 nm, and a pitch of a diffraction light guide pattern included in the diffraction light guide unit is 425 nm according to an embodiment of the present invention. Among the diffraction light, only diffraction light having a diffraction angle of $\theta_{min}$ or more may be totally reflected in the plastic lens substrate and may travel to the outgoing unit. A minimum diffraction angle ($\theta_{min}$, a threshold angle) at which total reflection occurs may be obtained by Equation 4 below:

$$n \sin \theta_{min} = n_0/n.$$  [Equation 4]

According to an exemplary embodiment of the present invention, the pitch of the diffraction light guide pattern may be 100 nm or more and 800 nm or less and the height may be more than 0 nm and 500 nm or less. Specifically, the pitch of the diffraction light guide pattern may be 100 nm or more and 500 nm or less, 100 nm or more and 300 nm or less, 200 nm or more and 700 nm or less, 200 nm or more and 500 nm or less, 200 nm or more and 300 nm or less, 300 nm or more and 700 or less, 300 nm or more and 500 nm or less, 400 nm or more and 700 nm or less, 400 nm or more and 500 nm or less, 500 nm or more and 700 nm or less, or 600 nm or more and 700 nm or less.

Further, specifically, the height of the diffraction light guide pattern may be more than 0 nm and 400 nm or less, more than 0 nm and 300 nm or less, or more than 0 nm and 200 nm or less. The diffraction light guide pattern has the pitch and the height within the above ranges, and as a result, the diffraction light may be efficiently totally reflected in the plastic lens substrate.

According to an exemplary embodiment of the present invention, the duty and a slanted angle of the diffraction light guide pattern may be appropriately adjusted within a range applicable to a normal diffraction light guide unit.

According to an exemplary embodiment of the present invention, the haze of the plastic lens substrate may be 1% or less. Further, according to an exemplary embodiment of the present invention, the plastic lens substrate may have light transmittance of 80% or more at the wavelength of 532 nm.

When ranges of the haze and the light transmittance of the plastic lens substrate are within the above ranges, the plastic lens substrate may have appropriate transparency as a purpose of the wearable device and furthermore, may increase the resolution of the image output through the plastic lens substrate.

According to an exemplary embodiment of the present invention, the surface flatness of the plastic lens substrate may be 1 μm or less. The surface flatness may have the same meaning as surface roughness $R_a$. Specifically, when the surface flatness is within the above range, a path of the diffraction light may be prevented from being deviated within the plastic lens substrate. Furthermore, degradation of the resolution of the image output through the plastic lens substrate may be minimized.

According to an exemplary embodiment of the present invention, the plastic lens substrate may include inorganic particles having a refractive index of 1.8 or more at the wavelength of 532 nm and a particle diameter of 50 nm or less.

According to an exemplary embodiment of the present invention, the inorganic particles may include at least one selected from silica, alumina, zirconia, zeolite, and titanium oxide.

According to an exemplary embodiment of the present invention, the inorganic particles may have a refractive index of 1.8 or more at the wavelength of 532 nm, specifically 1.9 or more, and more specifically 2.0 or more.

In this specification, the optical refractive index of the inorganic particle may be measured using an Abbe's refractometer. Further, the refractive index of the plastic substrate prepared by mixing the inorganic particles and an acrylate binder may be easily calculated by measuring the refractive index with an Ellipsometer. For example, when the refractive index of the plastic substrate produced by mixing 50 parts by weight of the inorganic particle with 50 parts by weight of acrylate HR6042 ($RI_{acrylate}$, refractive index of 1.60, density of 1.18) is $RI_{substrate}$, a volume fraction of acrylate is $V_{acrylic}$, and a volume fraction of the inorganic particle is $V_{particle}$, $RI_{substrate}=(RI_{acrylate} \times V_{acryl})+(RI_{particle} \times V_{particle})$, and as a result, the refractive index of the inorganic particle may be obtained by using $RI_{substrate}=(RI_{acrylate} \times V_{acryl})+(RI_{particle} \times V_{particle})$.

The organic particle may serve to implement the optical refractive index of the plastic lens substrate of 1.65 or more.

According to an embodiment of the present invention, the particle diameter of the inorganic particle may be 50 nm or less. Specifically, the particle diameter of the inorganic particle may be 40 nm or less, 35 nm or less, or 30 nm or less. Further, the particle diameter of the inorganic particle may be 5 nm or more or 10 nm or more. Furthermore, the particle diameter of the inorganic particle may be an average particle diameter.

When the particle diameter of the inorganic particle is within the above range, the inorganic particle may maintain high dispersibility at the time of manufacturing the plastic lens substrate and furthermore, transparency is imparted to the plastic lens substrate, thereby greatly enhancing the optical refractive index.

According to an exemplary embodiment of the present invention, the content of the inorganic particle may be 20 parts by weight or more and 70 parts by weight or less based on 100 parts by weight of a polymer matrix of the plastic lens substrate. Specifically, the content of the inorganic particle may be 25 parts by weight or more and 70 parts by weight or less or 30 parts by weight or more and 70 parts by weight or less with respect to 100 parts by weight of the polymer matrix of the plastic lens substrate.

When the content of the inorganic particles is within the above range, the optical refractive index of the plastic lens substrate may be implemented to be 1.65 or more at the wavelength of 532 nm.

According to an exemplary embodiment of the present invention, the plastic lens substrate may be formed using a matrix composition comprising a sulfur-containing compound containing at least 20 wt % of sulfur atoms. The sulfur-containing compound may serve to adjust the optical refractive index of the plastic lens substrate to a high level.

According to an exemplary embodiment of the present invention, the sulfur-containing compound may include at least one selected from a thiol group-containing compound, a thiourethane group-containing compound, and a thioepoxy group-containing compound.

The thiol group-containing compound as a compound containing at least one thiol group (—SH) in the molecule may be, for example, methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, bis(2-mercaptoethyl) sulfide, bis(2,3-dimercaptopropanyl) sulfide, bis(2,3-dimercaptopropanyl) disulfide, bis(mercaptomethyl)-3,6,9-trithiaundecane-1,11-dithiol, pentaeritritol tetrakis thioglycolate, pentaeritritol tetrakis(2-mercaptoacetate), pentaeritritol tris(3-mercaptoacetate), trimethylol propane tris(3-mercaptopropionate), trimethylol propane tetrakis(3-mercaptopropionate), etc., but is not limited thereto.

The thiourethane group-containing compound may be prepared by using a compound having at least one isocyanate group (—NCO) and at least one thiol group, and by adjusting a molar ratio (SH/NCO) of isocyanate to thiol, various thiourethane group-containing compound may be prepared. Examples of the compound having the isocyanate group include hexamethylene diisocyanate, isophorone diisocyanate, toluene diisocyanate, xylene diisocyanate, dimethylphenylene diisocyanate, and the like.

Examples of the thioepoxy group-containing compound may include bis(2,3-epithiopropyl) sulfide, bis(2,3-epithiopropyl) disulfide, bis(2,3-epithiopropyl) trisulfide, bis(2,3-epithiopropyl thio) cyclohexane, bis(2,3-epithiopropylthiocyclohexyl) sulfide, and the like.

According to an exemplary embodiment of the present invention, the plastic lens substrate may be one in which the inorganic particles are dispersed in an acrylic polymer matrix. Specifically, the plastic lens substrate may be manufactured using an acrylic monomer and/or an acrylic copolymer, and the matrix composition including the sulfur-containing compound.

According to an exemplary embodiment of the present invention, the plastic lens substrate may have a glass transition temperature ($T_g$) of 40° C. or higher. In the case of a wearable device, an image may be continuously transmitted and output, and as a result, a temperature of a lens substrate may rise. Therefore, the plastic lens substrate may have the glass transition temperature of 40° C. or higher and when the plastic lens substrate is used as a lens substrate of the wearable device, a change in physical property according to a temperature may be minimized.

According to an exemplary embodiment of the present invention, the diffraction light guide unit may include a first region on which light is incident and a second region in which the light is extracted.

According to an exemplary embodiment of the present invention, the diffraction light guide unit may be provided on the plastic lens substrate and may include the diffraction light guide pattern.

According to an exemplary embodiment of the present invention, the diffraction light guide unit may include a thermosetting resin or a photocurable resin containing a high-refraction component. Specifically, the thermosetting resin or the photocurable resin may include at least one selected from an acrylic resin including urethane acrylate or epoxy acrylate, a polyamide resin, a polyimide resin, a silicone resin, an epoxy resin and a polyester, but a type thereof is not limited.

Figure 4:
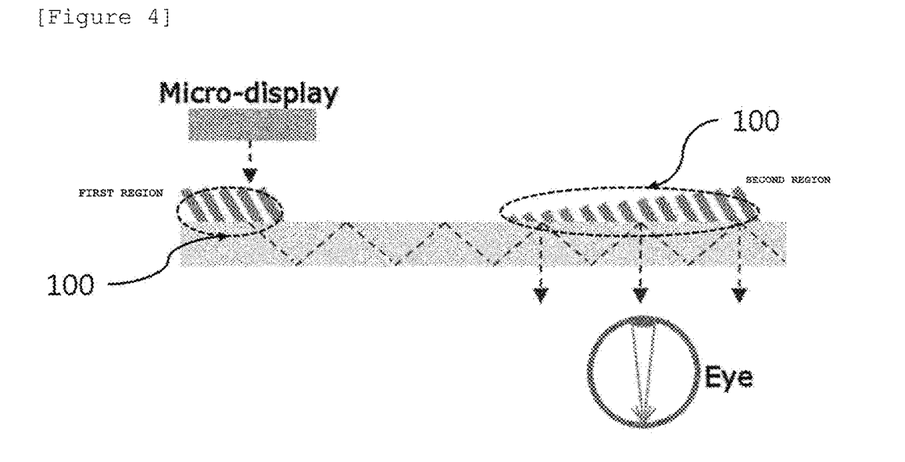
FIG. 4 is a schematic illustration of a process of light input from a micro-display, movement of the light through a plastic lens substrate of a wearable device to the eyes of a user according to an exemplary embodiment.

FIG. 4 is a diagram schematically illustrating a process of extracting light input from a micro-display with eyes of a user through a plastic lens substrate applied to a wearable device according to an embodiment of the present invention.

As illustrated in FIG. 4, the first region or the second region may include a diffraction light guide pattern in which the height gradually increases from one side to the other side.

According to an exemplary embodiment of the present invention, the diffraction light guide pattern of the second region may be provided at a slanted angle of 50° or more and less than 90° with respect to the plastic lens substrate.

According to an exemplary embodiment of the present invention, the height of the diffraction light guide pattern in the second region is gradually increased from one side to the other side of the second region to prevent the light amount from being decreased while the light is diffracted from one side to the other side of the second region, thereby making a light intensity of light emitted for each portion of the second region constant.

According to an exemplary embodiment of the present invention, the second region may include a diffraction light guide pattern in which the duty gradually increases from one side to the other side.

According to an exemplary embodiment of the present invention, the second region includes the diffraction light guide pattern in which the duty gradually increases from one side to the other side, thereby gradually increasing the optical refractive index from one side to the other side of the second region. The duty of the diffraction light guide pattern gradually increases from one side to the other side of the second region, and as a result, the optical refractive index may gradually increase from one side to the other side of the second region. The optical refractive index gradually increases from one side to the other side of the second region, and as a result, the optical diffraction efficiency may gradually increase from one side to the other side of the second region. According to an exemplary embodiment of the present invention, the duty of the diffraction light guide pattern included in the second region may be 0.1 or more and 1.0 or less. By adjusting the duty of the diffraction light guide pattern included in the second region to the above range, a second region having excellent light diffraction efficiency may be implemented.

Further, according to an exemplary embodiment of the present invention, by setting the pitch of the diffracting light guide pattern in the second region of the diffraction light guide unit to be constant and gradually increasing the width of the diffracting light guide pattern from one side to the other side of the second region, the duty of the diffraction light guide pattern may gradually increase from one side to the other side of the second region.

According to an exemplary embodiment of the present invention, the wearable device may be an augmented reality device or a virtual reality device.

The plastic lens substrate as a lens substrate of the wearable device may be applied as a substrate for inputting, moving, and transmitting input optical information, which includes the diffraction light guide unit on the one surface.

Since the plastic lens substrate has a high optical refractive index, optical loss may be minimized and the optical information may be moved. Furthermore, since the plastic lens substrate has a high glass transition temperature, it is possible to realize high durability by minimizing the change in physical properties due to heat generated by operating the wearable device. Furthermore, by the plastic lens substrate, the present invention may provide a wearable device that is lighter and stabler than the wearable device to which the glass lens substrate is applied in the related art.

Hereinafter, the present invention will be described in detail with reference to examples for a specific description. However, the examples according to the present invention may be modified in various forms, and it is not interpreted that the scope of the present invention is limited to the examples described below. The examples of this specification will be provided for more completely explaining the present invention to those skilled in the art.

Example 1

A plastic lens substrate having an optical refractive index of 1.70 with a thickness of 0.5 mm and at a wavelength of 532 nm was manufactured by a mold casting method to which a buffered spacer was applied using MGC Lumiplus LPJ-1102 as a material. A thickness deviation of the manufactured plastic lens substrate was 0.5%.

Furthermore, the manufactured plastic lens substrate was cut into 50×50 $mm^2$ and then, a UV curable imprint resin was applied on one surface in a thickness of 1 μm. A film-type mold is pressed in which a diffraction light guide pattern having a pitch of 425 nm, a depth of 125 nm, and a duty of 0.4 was formed on the mold in the form of an engraved film and then, exposed to UV to manufacture a diffraction light guide unit having a diffraction light guide pattern on the plastic lens substrate.

The plastic lens substrate according to Examples 2 to 4 and Comparative Examples 1 to 3 and the diffraction light guide unit on the plastic lens substrate were manufactured by the same method as Example 1 except that a physical property of the plastic lens substrate was adjusted as shown in Table 1. Further, the number of total reflections and a glass transition temperature of diffraction light were measured per 30 mm which is a length of the plastic lens substrate according to Examples 1 to 4 and Comparative Examples 1 to 3 above and shown in Table 1 below.

TABLE 1

| Examples and Comparative Examples | Material of plastic lens substrate | Optical refractive (@ 532 nm) | Number of total reflections of diffraction light per 30 mm as length of plastic lens substrate | Thickness (mm) | Thickness deviation (%) | $T_g$ (□) |
|---|---|---|---|---|---|---|
| Example 1 | LPJ-1102 | 1.7 | 83 | 0.5 | <1 | 90 |
| Example 2 | LPJ-1102 | 1.7 | 52 | 0.8 | <1 | 90 |
| Example 3 | LPJ-1102 | 1.7 | 41 | 1 | <1 | 90 |
| Example 4 | LPJ-1102 + bis(2,3-epithiopropyl) disulfide | 1.74 | 43 | 1 | <1 | 85 |

TABLE 1-continued

| Examples and Comparative Examples | Material of plastic lens substrate | Optical refractive (@ 532 nm) | Number of total reflections of diffraction light per 30 mm as length of plastic lens substrate | Thickness (mm) | Thickness deviation (%) | $T_g$ (□) |
|---|---|---|---|---|---|---|
| Comparative Example 1 | polycarbonate | 1.49 | 67 | 0.5 | 4 | 145 |
| Comparative Example 3 | LPJ-1102 | 1.7 | 138 | 0.3 | <1 | 90 |
| Comparative Example 3 | LPJ-1102 | 1.7 | 41 | 1 | 5 | 90 |

In addition, a critical angle, luminance, resolution, a viewing angle, transmittance, and haze were measured for the manufactured diffraction light guide unit according to Examples 1 to 4 and Comparative Examples 1 to 3 above and shown in Table 2 below.

TABLE 2

| Classification | Critical angle ($\theta_{min}$) | Viewing angle (FOV) | Luminance (cd/m²) | Resolution (MTF) | Transmittance (%) | Haze (%) |
|---|---|---|---|---|---|---|
| Example 1 | 36° | 41° | 2.23 | 0.21 | 89.3 | 0.2 |
| Example 2 | 36° | 41° | 10.95 | 0.36 | 88.7 | 0.3 |
| Example 3 | 36° | 41° | 19.25 | 0.64 | 88.4 | 0.3 |
| Example 4 | 35° | 44° | 18.99 | 0.53 | 87.2 | 0.2 |
| Comparative Example 1 | 42° | 29° | 5.19 | 0.17 | 90.4 | 0.4 |
| Comparative Example 2 | 36° | 41° | 0.17 | 0.16 | 89.8 | 0.3 |
| Comparative Example 3 | 36° | 41° | 19.03 | 0.19 | 88.4 | 0.3 |

Referring to Tables 1 and 2 above, in the wearable device according to Examples 1 to 4, the plastic lens substrate has a thickness of 0.4 mm or more and 1.5 mm or less, a thickness deviation of 1% or less, and the number of total reflections of the diffraction light of 40 times or more and 100 times or less per 30 mm length of the substrate, thereby providing an image having appropriate luminance and resolution to a user. Further, it can be seen that a wide viewing angle of 41° or more is provided to provide an image having excellent quality to the user.

On the contrary, it can be seen that the thickness deviations of the plastid lens substrates in Comparative Examples 1 and 3 are large as 4% and 5%, respectively and the resolution of the emitted image is low and in particular, in Comparative Example 1, the viewing angle is narrow and the haze is high, and as a result, image quality is degraded. It can be seen that the plastic lens substrate of Comparative Example 2 in which the thickness of the plastic lens substrate is small as 0.4 mm or less and the number of total reflections per 30 mm is 100 or more is very low in luminance, and as a result, the plastic lens substrate is not suitable for the wearable device.

EXPLANATION OF REFERENCE NUMERALS AND SYMBOLS

100: Diffraction light guide unit
110: Diffraction light guide pattern
210: Incident light
220: Diffraction light
300: Plastic lens substrate

The invention claimed is:

1. A wearable device comprising:
a plastic lens substrate; and
a diffraction light guide unit with a diffraction light guide pattern provided on the plastic lens substrate,
wherein a thickness of the plastic lens substrate is 0.4 mm or more and 1.5 mm or less and the plastic lens substrate comprises inorganic particles having a refractive index of 2.0 or more at a wavelength of 532 nm and a particle diameter of 50 nm or less,
wherein a thickness deviation for an average thickness of the plastic lens substrate is 1% or less,
wherein a number of total reflections of diffraction light per 30 mm length on the plastic lens substrate is 40 or more and 100 or less,
wherein the diffraction light guide unit includes a first region having a first diffraction light guide pattern on which light is incident and a second region having a second diffraction light guide pattern from which light is extracted,
wherein a height of the first diffraction light guide pattern or the second diffraction light guide pattern with respect to an upper surface of the plastic lens substrate increases from one side of the first or the second diffraction light guide pattern to an opposite side of the second diffraction light guide pattern, and
wherein the second diffraction light guide pattern are slanted at an angle of 50° or more and less than 90° with respect to the plastic lens substrate.

2. The wearable device of claim 1, wherein an optical refractive index of the plastic lens substrate at the wavelength of 532 nm is 1.65 or more.

3. The wearable device of claim 1, wherein a viewing angle is 30° or more.

4. The wearable device of claim 1, wherein a pitch of one or more of the first region and the second region of the diffraction light guide pattern is 100 nm or more and 800 nm or less and a height of one or more of the first region and the second region of the diffraction light guide pattern is 500 nm or less.

5. The wearable device of claim 1, wherein a haze of the plastic lens substrate is 1% or less.

6. The wearable device of claim 1, wherein light transmittance of the plastic lens substrate at a wavelength of 530 nm is 80% or more.

7. The wearable device of claim 1, wherein a glass transition temperature ($T_g$) of the plastic lens substrate is 40° C. or more.

8. The wearable device of claim 1, wherein the second diffraction light guide pattern increases in duty from one side to an opposite side.

9. The wearable device of claim 1, wherein the wearable device is an augmented reality device or a virtual reality device.

* * * * *